United States Patent

[11] 3,618,897

[72] Inventors John J. Swoboda, Jr.
  5602 Chippendale;
  Norman L. Swoboda, 2009 E. Rosebud, both of Victoria, Tex. 77901
[21] Appl. No. 836,298
[22] Filed June 25, 1969
[45] Patented Nov. 9, 1971

[54] CONSTANT TENSIONING SYSTEM
  1 Claim, 1 Drawing Fig.
[52] U.S. Cl. ................................ 254/172, 60/53, 91/6
[51] Int. Cl. .............................. B66d 1/48
[50] Field of Search .................... 91/6, 411, 412; 254/172; 60/53

[56] References Cited
  UNITED STATES PATENTS
  3,033,170  5/1962  Norton et al. ............ 91/6
  3,343,810  9/1967  Parnell .................. 254/172

FOREIGN PATENTS
1,102,406  2/1968  Great Britain ............ 254/172

Primary Examiner—Harvey C. Hornsby
Assistant Examiner—Merle F. Maffei
Attorneys—Bertram H. Mann, Frank B. Pugsley, James G. Ulmer and Delmar L. Sroufe ABSTRACT: A winch drum or capstan or the like upon which a load-bearing cable or rope is reeled is operated by an hydraulic, hydrostatic transmission through a suitable gear reduction. The transmission is adjustable as to direction as well as output rate by means of a feedback system including a servomotor or valve which has manually selected automatic and manual modes. In the automatic mode, a load cell or other instrumentality directly sensing the tension in the cable or rope acts through the servomotor to adjust the transmission and thereby actuate the reeling device as required to maintain the desired tension in the cable or rope. In the manual mode, the tension sensing instrumentality is rendered ineffective to adjust the transmission.

PATENTED NOV 9 1971 3,618,897
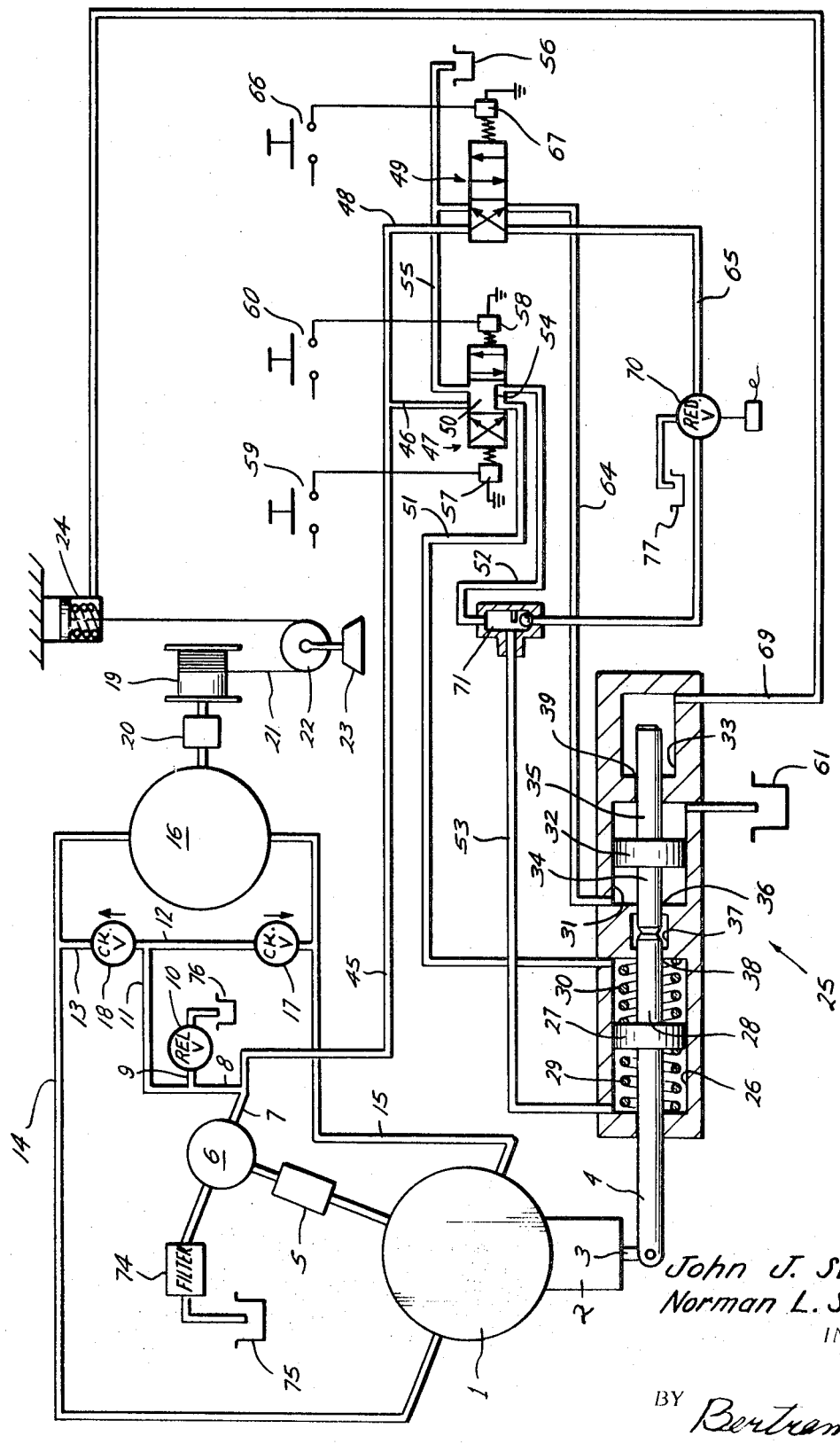
John J. Swoboda, Jr.
Norman L. Swoboda
INVENTORS
BY Bertram H Mann
ATTORNEY

3,618,897

CONSTANT TENSIONING SYSTEM

BACKGROUND OF THE INVENTION

1. Field of the Invention

This invention relates to apparatus for maintaining lifting, drawing, or securing cables at constant tension, and consists particularly in novel means for more sensitive control of a cable reeling drum, capstan, or the like than has been heretofore possible.

2. Description of the Prior Art

Previous devices for operating a winch drum or capstan by means of an hydrostatic transmission have been relatively insensitive and complicated due to utilizing, for instance, the hydraulic back pressure developed in the transmission itself as a feedback to adjust the pump portion of the transmission. Moreover, such devices have been relatively inflexible, lack versatility, and may be subject to loss of control of the reeling means in case of failure in the hydraulic system.

SUMMARY OF THE INVENTION

An object of the present invention is to provide an hydrostatic transmission and tension regulator for operating a cord reeling drum or capstan which is independent of the size of the drum or number of layers of cord on the drum, is substantially more sensitive and versatile, is less expensive, and is safer than prior equipment for the same purpose.

In accordance with this invention, the hydrostatic transmission incorporates a variable displacement hydraulic pump coupled to an hydraulic motor which, in turn, drives the cord reeling drum, windlass, or capstan through a suitable gear reduction. The tension in the cord is directly sensed by a load cell which supplies a variable feedback pressure to a servomotor. The servomotor has a first fluid-actuated part connected to the pump regulator and a second, separate part. In the automatic mode, a reference pressure and the load-cell generated pressure act oppositely on the two servomotor parts so they move in unison to actuate the pump regulator. Said part of the servomotor is normally centered by spring means in such position as to maintain the pump in its neutral or nonpumping position in case of balancing of the hydraulic forces acting thereon or failure in the hydraulic system. In the manual mode, the two parts of the servomotor are separated to remove the effect of the load cell on the regulator, and differential fluid pressures are applied manually to the mentioned first part of the servomotor.

BRIEF DESCRIPTION OF THE DRAWING

In the accompanying drawing, the FIGURE is a schematic representation of the novel constant tension system.

DESCRIPTION OF THE PREFERRED EMBODIMENT

The novel transmission comprises an hydraulic pump 1 which may be of the tilt plate or cam type having a regulator 2, which may be an overcenter control valve, with an actuating stem 3 pinned to servomotor control rod 4. Pump 1 is powered as by an electric motor or other power source 5 which also drives the hydraulic system charge pump 6. The charge pump is connected by hydraulic lines 7, 8, and 9 to an adjustable relief valve 10 and by lines 11, 12, and 13 to high pressure lines 14 and 15 connecting pump 1 to the main hydraulic motor 16. Lines 12 and 13 are provided with oppositely opening check valves 17 and 18. The hydraulic motor, in turn, drives a drum 19 through a gear reduction box 20. Wound upon the drum 19 is a cable 21 which passes around a travelling sheave block 22, to which the load 23 is secured, and thence is secured to the load cell 24 which directly senses the tension variations in cable 21. The invention would be applicable to various cord takeup and release arrangements, for instance, utilizing a windlass or capstan in place of drum 19.

Main hydraulic pump 1 is controlled both as to direction and rate of pumping by means of the servomotor, generally designated 25, through rod 4, stem 3, and pump regulator 2.

The servomotor includes a first cylinder portion 26 in which a first piston 27 reciprocates, the piston being rigidly secured to aligned rod portions 4 and 28 and being normally centered by means of opposing compression springs 29 and 30. In the centered position of piston 27, pump 1 is in its neutral or nonpumping position. As the piston moves in opposite directions from its centered position as shown, the direction of pumping is changed, as is the rate of pumping depending upon the direction of movement of the piston and its linear distance from the centered position. Servomotor 25 also includes a second chamber 31, in which a second piston 32 reciprocates, and a third chamber 33. Aligned rod portions 34 and 35 are formed rigidly with piston 32. Rod portion 34 passes through a close-fitting orifice 36 into a small, intermediate chamber 37. Rod portion 28 passes through a snug-fitting orifice 38 into the same chamber wherein it abuts the end of rod portion 34 in the automatic tension control mode of the system. Rod portion 35 extends through a closely fitting orifice 39 into third chamber 33.

Hydraulic charge pump 6 is connected by means of fluid lines 7, 45, and 46 to the three-position, direction controlling valve 47 and also by an additional fluid line 48 to a two-position, manual-automatic control valve 49. Valve 47 normally is in the centered or neutral position, as symbolized at 50, in which hydraulic lines 51 and 52, 53 are connected through a common annular slot 54 and a vent line 55 to the supply tank 56. Valve 47 is also controlled by solenoids 57 and 58 to alternately connect servomotor actuating lines 51 and 52, 53 to reference pressure line 45, 46 and vent line 55 to urge pump control piston 27 rightwardly or leftwardly from its centered position. Solenoids 57 and 58, in turn, are controlled by manual switches 59 and 60.

Automatic-manual valve 49 is normally in the manual mode position as illustrated, in which reference pressure line 48 connects through fluid line 64 to second chamber 31 at the left side of servomotor piston 32, and vent line 55 is connected to hydraulic line 65. Valve 49 is controlled by a switch 66 through a solenoid 67. The opposite side of piston 32 is constantly vented to tank 61.

Third chamber 33 in the servomotor is constantly connected through a fluid line 69 to the load cell 24 so as to expose said chamber and the end of rod portion 35 to a pressure which directly and closely reflects varying tensions in cable 19. The pressure charge in line 69 and the load cell is such that the product of this pressure and the area of the end of rod portion 35 will be sufficiently less than the product of the reference pressure in line 64 and the area of the left-hand face of piston 32 so that, in the manual mode, piston 32 will be forced to its extreme rightward position and out of contact with rod portion 28. Fluid line 65 passes through pressure reducing valve 70 to a two-way check valve 71 which alternately connects fluid lines 65 and 52 to line 53 and chamber 26 at the left end of the servomotor. Check valve 71 responds to pressure differential in lines 52 and 65. When a solenoid 67 is energized by manual switch 66, valve 49 is moved to its automatic mode in which fluid line 64 is vented through line 55 and fluid line 65 is connected to reference pressure line 48.

Hydraulic charge pump 6 is supplied from an hydraulic fluid source 75 through a filter 74, while relief valve 10 and reducing valve 70 are vented, respectively, to tanks as 76 and 77, both of which, as well as vent tank 56, preferably, will be the same supply tank.

In operation, as previously explained, valves 47 and 49 normally will stand, respectively, in their neutral and manual mode positions with fluid lines 51 and 52 vented, piston 32 retracted, and pump regulator 2 held in its neutral position by opposed compression springs 29 and 30 which center servomotor piston 27. With main hydraulic pump 1 and hydraulic charge pump 6 operated by electric motor 5, the operator may control drum 19 or the like to control his load 23 as desired. For instance, if the load is to be lifted or the tension on cable 21 increased, button 59, the "wind" button, is closed to energize solenoid 57 and move valve 47 in the corresponding direction. Unwinding of the drum is effected by closing of switch 60. The extent of movement of piston 27 and the pump regulator 2 is determined by the time switch 59 or 60 is held closed. During manual mode operation, of course, switch 66 will remain open and solenoid 67 deenergized. The effect of closing switches 59 and 60, as explained, will be to alternately connect fluid lines 51 and 52, 53 to reference pressure line 45, 46 and vent line 55 while, of course, piston 32 will be in its extreme rightward (retracted) position so as to have no effect upon pump control piston 27.

For automatic operation of the system, switch 66 will be closed to energize solenoid 67 and shift valve 49 to the automatic position with lines 64 and 65 now connected, respectively, to reference pressure line 45, 48 and vent line 55. The pressured fluid in line 65, reduced by reducing valve 70, shifts check valve 71 upwardly and passes through fluid line 53 to chamber 26 at the left side of piston 27. Opposing pressure will be supplied to chamber 33 through fluid line 69 from load cell 24 and will act upon the smaller end of rod portion 35. The pressures in lines 53 and 69 are adjusted so that piston 27 and regulator 2 will be in their centered, nonpumping positions when cable or cord 21 is at its proper tension. A decrease of the cable tension from this desired value will decrease the pressure in line 69, permitting piston 27 to move rightwardly a corresponding amount for reeling in cable 21 upon drum 19 sufficiently to restore the cable to the adjusted tension. On the other hand, should the tension in cable 19 increase, the pressure in line 69 likewise will increase, causing piston 27 to move leftwardly which reverses the direction of pump 1 and causes proportionate unreeling of the cable from drum 19. Such regulation of the cable tension, accordingly, is proportional to the directly sensed cable loading and independent, for instance, of the size of the drum or the number of layers of cord wound thereon.

I have found that the use of a device, such as the load cell 24 or a torque arm or the last stage of the speed reducer 20, which directly senses the tension of the loaded cable in the same manner as the load cell, provides for much improved sensitivity and stability, as distinguished, for instance, from a type of feedback utilizing fluid pressure in the hydraulic transmission for this purpose. Reducing valve 70 is adjustable for controlling the tension in cable 21. Also, the improved tensioning system is of the fail-safe variety in that the normal biased position of the hydraulic pump 1 is for no pumping. Furthermore, means are provided for readily and effectively transferring between automatic and manual modes. Finally, the novel servo arrangement assures highly sensitive modulation of the hydraulic pump with the result that constant tensioning of the load cable is achieved to a substantially greater extent than heretofore known devices for a similar purpose.

Various features may be modified as will occur to those skilled in the art.

We claim:

1. Apparatus for regulating the tensioning of a load-carrying cord wound on a drum and irrespective of the size of the drum or the number of layers of cord thereon comprising an interconnected, reversible hydraulic pump and motor system coupled to said drum for driving the same, a regulator for said pump, reversible fluid motor means operatively connected to said regulator, a source of reference fluid pressure, and a load-sensing instrumentality directly connected to said cord, said instrumentality being of the type capable of supplying varying fluid pressures proportional to the load sensed and irrespective of the size of the drum or the number of layers of cord thereon, said fluid motor means comprising first and second fluid motors, said first fluid motor having a first movable member operatively connected to said regulator, a first pair of fluid lines connecting said source and said first fluid motor, said second fluid motor having a second movable member with a one-way operative connection to said first movable member, a second pair of fluid lines connecting the outer sides of said first and second movable members, respectively, with said source and said instrumentality, an additional fluid line connecting said source and the inner side of said second movable member, valve means in said additional line for selectively applying fluid pressure to said additional line to shift said second movable member out of operative connection with said first movable member to terminate automatic control of the cord tension, and manual valve means in said second line for applying differential fluid pressures to said first movable member for effecting manual control of said regulator and said drum.

* * * * *